(12) United States Patent
Jacobsen et al.

(10) Patent No.: US 8,392,036 B2
(45) Date of Patent: Mar. 5, 2013

(54) POINT AND GO NAVIGATION SYSTEM AND METHOD

(75) Inventors: Stephen C. Jacobsen, Salt Lake City, UT (US); Marc X. Olivier, Sandy, UT (US)

(73) Assignee: Raytheon Company, Waltham, MA (US)

( * ) Notice: Subject to any disclaimer, the term of this patent is extended or adjusted under 35 U.S.C. 154(b) by 781 days.

(21) Appl. No.: 12/350,693

(22) Filed: Jan. 8, 2009

(65) Prior Publication Data

US 2010/0174422 A1 Jul. 8, 2010

(51) Int. Cl.
*G05B 11/00* (2006.01)
(52) U.S. Cl. ...................................... 701/2; 318/568.12
(58) Field of Classification Search ................ 701/2, 23; 700/245, 258, 253; 318/568.11, 567, 568.16, 318/568.12, 568.18, 568.19, 568.25
See application file for complete search history.

(56) References Cited

U.S. PATENT DOCUMENTS

| | | | |
|---|---|---|---|
| 1,107,874 A | 8/1914 | Appleby |
| 1,112,460 A | 10/1914 | Leavitt |
| 1,515,756 A | 11/1924 | Roy |
| 1,975,726 A | 10/1934 | Martinage |
| 2,025,999 A | 12/1935 | Myers |
| 2,082,920 A | 6/1937 | Aulmont |
| 2,129,557 A | 9/1938 | Beach |
| 2,312,072 A | 3/1940 | Broadwater |
| 2,311,475 A | 2/1943 | Schmeiser |
| 2,329,582 A | 9/1943 | Bishop |
| 2,345,763 A | 4/1944 | Mayne |
| 2,701,169 A | 2/1955 | Cannon |
| 2,850,147 A | 9/1958 | Hill |
| 2,933,143 A | 4/1960 | Robinson et al. |
| 2,967,737 A | 1/1961 | Moore |
| 3,037,571 A | 6/1962 | Zelle |
| 3,060,972 A | 10/1962 | Aheldon |
| 3,107,643 A | 10/1963 | Edwards |
| 3,166,138 A | 1/1965 | Dunn, Jr. |
| 3,190,286 A | 6/1965 | Stokes |
| 3,215,219 A | 11/1965 | Forsyth et al. |
| 3,223,462 A | 12/1965 | Dalrymple |
| 3,266,059 A | 8/1966 | Stelle |
| 3,284,964 A | 11/1966 | Saito |
| 3,311,424 A | 3/1967 | Taylor |

(Continued)

FOREIGN PATENT DOCUMENTS

| CA | 2512299 | 9/2004 |
|---|---|---|
| CN | 1603068 A | 4/2005 |

(Continued)

OTHER PUBLICATIONS

U.S. Appl. No. 12/694,996, filed Jan. 27, 2010; Stephen C. Jacobsen; Office Action Issued Sep. 30, 2010.

(Continued)

*Primary Examiner* — Dalena Tran
(74) *Attorney, Agent, or Firm* — Thorpe North & Western LLP (57) ABSTRACT

A remote operator console provides point and go navigation of a robotic vehicle. The remote operator console provides a display for visual representation of the environment in which the robotic vehicle is operating based on sensor information received from the robotic vehicle. An operator may designate a target point on the display. The robotic vehicle is automatically navigated toward a location in the environment corresponding to the designated target point.

24 Claims, 2 Drawing Sheets

U.S. PATENT DOCUMENTS

| | | |
|---|---|---|
| 3,362,492 A | 1/1968 | Hansen |
| 3,387,896 A | 6/1968 | Sobota |
| 3,489,236 A | 1/1970 | Goodwin |
| 3,497,083 A | 2/1970 | Abdersib |
| 3,565,198 A | 2/1971 | Ames |
| 3,572,325 A | 3/1971 | Bazell et al. |
| 3,609,804 A | 10/1971 | Morrison |
| 3,650,343 A | 3/1972 | Helsell |
| 3,700,115 A | 10/1972 | Johnson et al. |
| 3,707,218 A | 12/1972 | Payne et al. |
| 3,712,481 A | 1/1973 | Harwood |
| 3,715,146 A | 2/1973 | Robertson |
| 3,757,635 A | 9/1973 | Hickerson et al. |
| 3,808,078 A | 4/1974 | Snellman d et al. |
| 3,820,616 A | 6/1974 | Juergens |
| 3,841,424 A | 10/1974 | Purcell et al. |
| 3,864,983 A | 2/1975 | Jacobsen |
| 3,933,214 A | 1/1976 | Guibord et al. |
| 3,934,664 A | 1/1976 | Pohjola |
| 3,974,907 A | 8/1976 | Shaw et al. |
| 4,015,553 A | 4/1977 | Middleton |
| 4,051,914 A | 10/1977 | Pohjola |
| 4,059,315 A | 11/1977 | Jolliffe et al. |
| 4,068,905 A | 1/1978 | Black et al. |
| 4,107,948 A | 8/1978 | Molaug |
| 4,109,971 A | 8/1978 | Black et al. |
| 4,132,279 A | 1/1979 | Van der Lende et al. |
| 4,218,101 A | 8/1980 | Thompson |
| 4,260,053 A | 4/1981 | Onodera |
| 4,332,317 A | 6/1982 | Bahre et al. |
| 4,332,424 A | 6/1982 | Thompson |
| 4,339,031 A | 7/1982 | Densmore |
| 4,393,728 A | 7/1983 | Larson et al. |
| 4,396,233 A | 8/1983 | Slaght |
| 4,453,611 A | 6/1984 | Stacy, Jr. |
| 4,483,407 A | 11/1984 | Iwamoto et al. |
| 4,489,826 A | 12/1984 | Dubson |
| 4,494,417 A | 1/1985 | Larson et al. |
| 4,551,061 A | 11/1985 | Olenick |
| 4,589,460 A | 5/1986 | Albee |
| 4,621,965 A | 11/1986 | Wilcock |
| 4,636,137 A | 1/1987 | Lemelson |
| 4,646,906 A | 3/1987 | Wilcox, Jr. et al. |
| 4,661,039 A | 4/1987 | Brenholt |
| 4,671,774 A | 6/1987 | Owsen |
| 4,700,693 A | 10/1987 | Lia et al. |
| 4,706,506 A | 11/1987 | Lestelle |
| 4,712,969 A | 12/1987 | Kimura |
| 4,713,896 A | 12/1987 | Jennens |
| 4,714,125 A | 12/1987 | Stacy, Jr. |
| 4,727,949 A | 3/1988 | Rea |
| 4,736,826 A | 4/1988 | White et al. |
| 4,752,105 A | 6/1988 | Barnard |
| 4,756,662 A | 7/1988 | Tanie et al. |
| 4,765,795 A | 8/1988 | Rebman |
| 4,784,042 A | 11/1988 | Painter |
| 4,796,607 A | 1/1989 | Allred, III et al. |
| 4,806,066 A | 2/1989 | Rhodes et al. |
| 4,815,319 A | 3/1989 | Clement et al. |
| 4,815,911 A | 3/1989 | Bengtsson et al. |
| 4,818,175 A | 4/1989 | Kimura |
| 4,828,339 A | 5/1989 | Thomas et al. |
| 4,828,453 A | 5/1989 | Martin et al. |
| 4,848,179 A | 7/1989 | Ubhayakar |
| 4,862,808 A | 9/1989 | Hedgcoxe et al. |
| 4,878,451 A | 11/1989 | Siren |
| 4,900,218 A | 2/1990 | Sutherland |
| 4,909,341 A | 3/1990 | Rippingale et al. |
| 4,924,153 A | 5/1990 | Toru et al. |
| 4,932,491 A | 6/1990 | Collins, Jr. |
| 4,932,831 A | 6/1990 | White et al. |
| 4,936,639 A | 6/1990 | Pohjola |
| 4,977,790 A | 12/1990 | Nishi et al. |
| 5,018,591 A | 5/1991 | Price |
| 5,021,798 A | 6/1991 | Ubhayakar |
| 5,022,812 A | 6/1991 | Coughlan et al. |
| 5,046,914 A | 9/1991 | Holland et al. |
| 5,080,000 A | 1/1992 | Bubic |
| 5,130,631 A | 7/1992 | Gordon et al. |
| 5,142,932 A | 9/1992 | Moya et al. |
| 5,174,168 A | 12/1992 | Takagi et al. |
| 5,174,405 A | 12/1992 | Carra et al. |
| 5,186,526 A | 2/1993 | Pennington |
| 5,199,771 A | 4/1993 | James et al. |
| 5,205,612 A | 4/1993 | Sugden et al. |
| 5,214,858 A | 6/1993 | Pepper et al. |
| 5,219,264 A | 6/1993 | McClure et al. |
| 5,252,870 A | 10/1993 | Jacobsen et al. |
| 5,297,443 A | 3/1994 | Wentz |
| 5,317,952 A | 6/1994 | Immega |
| 5,337,732 A | 8/1994 | Grundfest et al. |
| 5,337,846 A | 8/1994 | Ogaki et al. |
| 5,350,033 A | 9/1994 | Kraft |
| 5,354,124 A | 10/1994 | James |
| 5,363,935 A | 11/1994 | Schempf |
| 5,386,741 A | 2/1995 | Rennex |
| 5,413,454 A | 5/1995 | Movsesian |
| 5,426,336 A | 6/1995 | Jacobsen et al. |
| 5,428,713 A | 6/1995 | Matsumaru |
| 5,435,405 A | 7/1995 | Schempf et al. |
| 5,440,916 A | 8/1995 | Stone et al. |
| 5,443,354 A | 8/1995 | Stone et al. |
| 5,451,135 A | 9/1995 | Schempf et al. |
| 5,465,525 A | 11/1995 | Mifune et al. |
| 5,466,056 A | 11/1995 | James et al. |
| 5,469,756 A | 11/1995 | Feiten |
| 5,516,249 A | 5/1996 | Brimhall |
| 5,519,814 A | 5/1996 | Rodriguez et al. |
| 5,551,545 A | 9/1996 | Gelfman |
| 5,556,370 A | 9/1996 | Maynard |
| 5,562,843 A | 10/1996 | Yasumoto |
| 5,567,110 A | 10/1996 | Sutherland |
| 5,570,992 A | 11/1996 | Lemelson |
| 5,573,316 A | 11/1996 | Wankowski |
| 5,588,688 A | 12/1996 | Jacobsen et al. |
| 5,672,044 A | 9/1997 | Lemelson |
| 5,697,285 A | 12/1997 | Nappi et al. |
| 5,712,961 A | 1/1998 | Matsuo |
| 5,749,828 A | 5/1998 | Solomon et al. |
| 5,770,913 A | 6/1998 | Mizzi |
| 5,816,769 A | 10/1998 | Bauer et al. |
| 5,821,666 A | 10/1998 | Matsumoto et al. |
| 5,842,381 A | 12/1998 | Feiten |
| RE36,025 E | 1/1999 | Suzuki |
| 5,878,783 A | 3/1999 | Smart |
| 5,888,235 A | 3/1999 | Jacobsen et al. |
| 5,902,254 A | 5/1999 | Magram |
| 5,906,591 A | 5/1999 | Dario et al. |
| 5,984,032 A | 11/1999 | Gremillion et al. |
| 5,996,346 A | 12/1999 | Maynard |
| 6,016,385 A | 1/2000 | Yee et al. |
| 6,030,057 A | 2/2000 | Fikse |
| 6,056,237 A | 5/2000 | Woodland |
| 6,107,795 A | 8/2000 | Smart |
| 6,109,705 A | 8/2000 | Courtemanche |
| 6,113,343 A | 9/2000 | Goldenberg et al. |
| 6,132,133 A | 10/2000 | Muro et al. |
| 6,138,604 A | 10/2000 | Anderson et al. |
| 6,162,171 A | 12/2000 | Ng et al. |
| 6,186,604 B1 | 2/2001 | Fikse |
| 6,203,126 B1 | 3/2001 | Harguth |
| 6,260,501 B1 | 7/2001 | Agnew |
| 6,263,989 B1 | 7/2001 | Won |
| 6,264,293 B1 | 7/2001 | Musselman et al. |
| 6,264,294 B1 | 7/2001 | Musselman et al. |
| 6,281,489 B1 | 8/2001 | Tubel et al. |
| 6,323,615 B1 | 11/2001 | Khairallah |
| 6,325,749 B1 | 12/2001 | Inokuchi et al. |
| 6,333,631 B1 | 12/2001 | Das et al. |
| 6,339,993 B1 | 1/2002 | Comello et al. |
| 6,380,889 B1 | 4/2002 | Herrmann et al. |
| 6,394,204 B1 | 5/2002 | Haringer |
| 6,405,798 B1 | 6/2002 | Barrett et al. |
| 6,408,224 B1 | 6/2002 | Okamoto et al. |
| 6,411,055 B1 | 6/2002 | Fujita et al. |
| 6,422,509 B1 | 7/2002 | Yim |
| 6,430,475 B2 | 8/2002 | Okamoto et al. |

| | | | | | | |
|---|---|---|---|---|---|---|
| 6,431,296 B1 | 8/2002 | Won | | 2003/0000747 A1 | 1/2003 | Sugiyama et al. |
| 6,446,718 B1 | 9/2002 | Barrett et al. | | 2003/0069474 A1 | 4/2003 | Couvillon, Jr. |
| 6,450,104 B1 | 9/2002 | Grant et al. | | 2003/0097080 A1 | 5/2003 | Esashi et al. |
| 6,477,444 B1 | 11/2002 | Bennett et al. | | 2003/0110938 A1 | 6/2003 | Seto et al. |
| 6,484,083 B1 | 11/2002 | Hayward | | 2003/0223844 A1 | 12/2003 | Schiele et al. |
| 6,488,306 B1 | 12/2002 | Shirey et al. | | 2004/0030571 A1 | 2/2004 | Solomon |
| 6,505,896 B1 | 1/2003 | Boivin et al. | | 2004/0099175 A1 | 5/2004 | Perrot et al. |
| 6,512,345 B2 | 1/2003 | Borenstein et al. | | 2004/0103740 A1 | 6/2004 | Townsend et al. |
| 6,522,950 B1 | 2/2003 | Conca et al. | | 2004/0168837 A1 | 9/2004 | Michaud et al. |
| 6,523,629 B1 | 2/2003 | Buttz et al. | | 2004/0216931 A1 | 11/2004 | Won |
| 6,529,806 B1 | 3/2003 | Licht | | 2004/0216932 A1 | 11/2004 | Giovanetti et al. |
| 6,535,793 B2 * | 3/2003 | Allard ............................ 700/259 | | 2005/0007055 A1 | 1/2005 | Borenstein |
| 6,540,310 B1 | 4/2003 | Cartwright | | 2005/0027412 A1 | 2/2005 | Hobson et al. |
| 6,557,954 B1 | 5/2003 | Hattori | | 2005/0085693 A1 | 4/2005 | Belson |
| 6,563,084 B1 | 5/2003 | Bandy et al. | | 2005/0107669 A1 | 5/2005 | Couvilion, Jr. |
| 6,574,958 B1 | 6/2003 | Macgregor | | 2005/0115337 A1 | 6/2005 | Tarumi |
| 6,576,406 B1 | 6/2003 | Jacobsen et al. | | 2005/0166413 A1 | 8/2005 | Crampton |
| 6,595,812 B1 | 7/2003 | Haney | | 2005/0168068 A1 | 8/2005 | Courtemanche et al. |
| 6,610,007 B2 | 8/2003 | Belson et al. | | 2005/0168070 A1 | 8/2005 | Dandurand |
| 6,619,146 B2 | 9/2003 | Kerrebrock | | 2005/0225162 A1 | 10/2005 | Gibbins |
| 6,636,781 B1 | 10/2003 | Shen et al. | | 2005/0235898 A1 | 10/2005 | Hobson et al. |
| 6,651,804 B2 | 11/2003 | Thomas et al. | | 2005/0235899 A1 | 10/2005 | Yamamoto et al. |
| 6,652,164 B2 | 11/2003 | Stiepel et al. | | 2005/0288819 A1 | 12/2005 | de Guzman |
| 6,668,951 B2 | 12/2003 | Won | | 2006/0000137 A1 | 1/2006 | Valdivia y Alvarado et al. |
| 6,708,068 B1 | 3/2004 | Sakaue | | 2006/0005733 A1 | 1/2006 | Rastegar et al. |
| 6,715,575 B2 | 4/2004 | Karpik | | 2006/0010702 A1 | 1/2006 | Roth et al. |
| 6,725,128 B2 | 4/2004 | Hogg et al. | | 2006/0070775 A1 | 4/2006 | Anhalt et al. |
| 6,772,673 B2 | 8/2004 | Seto et al. | | 2006/0117324 A1 | 6/2006 | Alsafadi et al. |
| 6,773,327 B1 | 8/2004 | Felice et al. | | 2006/0156851 A1 | 7/2006 | Jacobsen et al. |
| 6,774,597 B1 | 8/2004 | Borenstein | | 2006/0225928 A1 | 10/2006 | Nelson |
| 6,799,815 B2 | 10/2004 | Krishnan et al. | | 2006/0229773 A1 | 10/2006 | Peretz |
| 6,820,653 B1 | 11/2004 | Schempf et al. | | 2006/0290779 A1 | 12/2006 | Reverte et al. |
| 6,831,436 B2 | 12/2004 | Gonzalez | | 2007/0029117 A1 | 2/2007 | Goldenberg et al. |
| 6,835,173 B2 | 12/2004 | Couvillon, Jr. | | 2007/0156286 A1 | 7/2007 | Yamauchi |
| 6,837,318 B1 | 1/2005 | Craig et al. | | 2007/0193790 A1 | 8/2007 | Goldenberg et al. |
| 6,840,588 B2 | 1/2005 | Deland et al. | | 2007/0260378 A1 | 11/2007 | Clodfelter |
| 6,866,671 B2 | 3/2005 | Tierney et al. | | 2007/0293989 A1 | 12/2007 | Norris |
| 6,870,343 B2 | 3/2005 | Borenstein et al. | | 2008/0115687 A1 | 5/2008 | Gal |
| 6,889,118 B2 | 5/2005 | Murray et al. | | 2008/0164079 A1 | 7/2008 | Jacobsen |
| 6,917,176 B2 | 7/2005 | Schempf et al. | | 2008/0167752 A1 | 7/2008 | Jacobsen |
| 6,923,693 B2 | 8/2005 | Borgen et al. | | 2008/0168070 A1 | 7/2008 | Naphade et al. |
| 6,936,003 B2 | 8/2005 | Iddan | | 2008/0215185 A1 | 9/2008 | Jacobsen et al. |
| 6,959,231 B2 | 10/2005 | Maeda | | 2008/0272647 A9 | 11/2008 | Hirose et al. |
| 7,020,701 B1 | 3/2006 | Gelvin et al. | | 2008/0284244 A1 | 11/2008 | Hirose et al. |
| 7,040,426 B1 | 5/2006 | Berg | | 2009/0035097 A1 | 2/2009 | Loane |
| 7,044,245 B2 | 5/2006 | Anhalt et al. | | 2009/0171151 A1 | 7/2009 | Choset et al. |
| 7,069,124 B1 | 6/2006 | Whittaker et al. | | 2009/0212157 A1 | 8/2009 | Arlton et al. |
| 7,090,637 B2 | 8/2006 | Danitz et al. | | 2010/0030377 A1 | 2/2010 | Unsworth |
| 7,137,465 B1 | 11/2006 | Kerrebrock et al. | | 2010/0036544 A1 | 2/2010 | Mashiach |
| 7,144,057 B1 | 12/2006 | Young et al. | | 2010/0201185 A1 | 8/2010 | Jacobsen et al. |
| 7,171,279 B2 | 1/2007 | Buckingham et al. | | 2010/0258365 A1 | 10/2010 | Jacobsen |
| 7,188,473 B1 | 3/2007 | Asada | | 2010/0268470 A1 | 10/2010 | Kamal et al. |
| 7,188,568 B2 | 3/2007 | Stout | | 2010/0317244 A1 | 12/2010 | Jacobsen et al. |
| 7,228,203 B2 | 6/2007 | Koselka et al. | | 2010/0318242 A1 | 12/2010 | Jacobsen |
| 7,235,046 B2 | 6/2007 | Anhalt et al. | | 2012/0205168 A1 | 8/2012 | Flynn et al. |
| 7,331,436 B1 | 2/2008 | Pack et al. | | | | |
| 7,387,179 B2 | 6/2008 | Anhalt et al. | | FOREIGN PATENT DOCUMENTS | | |
| 7,415,321 B2 | 8/2008 | Okazaki et al. | | | | |
| 7,475,745 B1 | 1/2009 | DeRoos | | CN | 2774717 | 4/2006 |
| 7,539,557 B2 * | 5/2009 | Yamauchi .................... 700/245 | | CN | 1 970 373 | 5/2007 |
| 7,546,912 B1 | 6/2009 | Pack et al. | | DE | 3025840 | 2/1982 |
| 7,597,162 B2 * | 10/2009 | Won ............................ 180/9.32 | | DE | 3626238 | 2/1988 |
| 7,600,592 B2 | 10/2009 | Goldenberg et al. | | DE | 19617852 | 10/1997 |
| 7,645,110 B2 | 1/2010 | Ogawa et al. | | DE | 19714464 | 10/1997 |
| 7,654,348 B2 | 2/2010 | Ohm et al. | | DE | 197 04 080 | 8/1998 |
| 7,775,312 B2 | 8/2010 | Maggio | | DE | 100 18 075 | 1/2001 |
| 7,798,264 B2 | 9/2010 | Hutcheson et al. | | DE | 102004010089 | 9/2005 |
| 7,843,431 B2 | 11/2010 | Robbins et al. | | EP | 0 105 418 | 4/1984 |
| 7,845,440 B2 | 12/2010 | Jacobsen | | EP | 0584520 | 3/1994 |
| 7,860,614 B1 | 12/2010 | Reger | | EP | 0 818 283 | 1/1998 |
| 7,974,736 B2 * | 7/2011 | Morin et al. .................. 700/245 | | EP | 0 924 034 | 6/1999 |
| 8,042,630 B2 | 10/2011 | Jacobsen | | EP | 1 444 043 | 8/2004 |
| 8,162,410 B2 | 4/2012 | Hirose et al. | | EP | 1 510 896 | 3/2005 |
| 8,205,695 B2 | 6/2012 | Jacobsen et al. | | EP | 1 832 501 | 9/2007 |
| 2001/0037163 A1 | 11/2001 | Allard | | EP | 1 832 502 | 9/2007 |
| 2002/0038168 A1 | 3/2002 | Kasuga et al. | | FR | 2638813 | 5/1990 |
| 2002/0128714 A1 | 9/2002 | Manasas et al. | | FR | 2 850 350 | 7/2004 |
| 2002/0140392 A1 | 10/2002 | Borenstein | | GB | 1199729 | 7/1970 |
| 2002/0189871 A1 | 12/2002 | Won | | JP | 51-106391 | 8/1976 |
| | | | | JP | 52 57625 | 5/1977 |

| | | |
|---|---|---|
| JP | 52122431 | 9/1977 |
| JP | 58-89480 | 5/1983 |
| JP | SHO 58-80387 | 5/1983 |
| JP | 59139494 | 9/1984 |
| JP | 60015275 | 1/1985 |
| JP | 60047771 | 3/1985 |
| JP | 60060516 | 4/1985 |
| JP | 60139576 | 7/1985 |
| JP | 61 001581 | 1/1986 |
| JP | SHO 61-1581 | 1/1986 |
| JP | SHO61-020484 | 2/1986 |
| JP | SHO61-054378 | 3/1986 |
| JP | SHO61-075069 | 4/1986 |
| JP | 61089182 | 5/1986 |
| JP | 62165207 | 7/1987 |
| JP | 62-162626 | 10/1987 |
| JP | SHO 63-32084 | 3/1988 |
| JP | 63306988 | 12/1988 |
| JP | 04092784 | 3/1992 |
| JP | 4126656 | 4/1992 |
| JP | HEI 5-3087 | 1/1993 |
| JP | 05147560 | 6/1993 |
| JP | HEI05-270454 | 10/1993 |
| JP | HEI 5-286460 | 11/1993 |
| JP | 06-115465 | 4/1994 |
| JP | HEI 8-133141 | 11/1994 |
| JP | 2007-216936 | 8/1995 |
| JP | 7329841 | 12/1995 |
| JP | HEI 7-329837 | 12/1995 |
| JP | HEI 9-142347 | 6/1997 |
| JP | 2003-237618 | 2/2002 |
| JP | 2003-019985 | 1/2003 |
| JP | 2003-315486 | 11/2003 |
| JP | 03 535508 | 6/2004 |
| JP | 2004536634 | 12/2004 |
| JP | 2005-081447 | 3/2005 |
| JP | 2005 111595 | 4/2005 |
| JP | 2006510496 | 3/2006 |
| JP | 2007-237991 | 9/2007 |
| JP | 2010-509129 | 3/2010 |
| WO | WO 87/02635 | 5/1987 |
| WO | WO97/26039 | 7/1997 |
| WO | WO 00/10073 | 2/2000 |
| WO | WO 02/16995 | 2/2002 |
| WO | WO03/030727 | 4/2003 |
| WO | WO 03/037515 | 5/2003 |
| WO | WO 2004/056537 | 7/2004 |
| WO | WO2005/018428 | 3/2005 |
| WO | WO 2006 068080 | 6/2006 |
| WO | WO 2008/049050 | 4/2008 |
| WO | WO 2008/076194 | 6/2008 |
| WO | WO 2008/135978 | 11/2008 |
| WO | WO 2009/009673 | 1/2009 |

OTHER PUBLICATIONS

U.S. Appl. No. 12/151,730, filed May 7, 2008; Stephen C. Jacobsen; Office Action Issued Nov. 15, 2010.
U.S. Appl. No. 12/171,144, filed Jul. 10, 2008; Stephen C. Jacobsen; Office Action Issued Aug. 11, 2010.
U.S. Appl. No. 11/985,324, filed Nov. 13, 2007; Stephen C. Jacobsen; Office Action Issued Nov. 1, 2010.
PCT/US10/38331; filed Jun. 11, 2009; Stephen C. Jacobsen; ISR Issued Dec. 1, 2010.
U.S. Appl. No. 12/820,881, filed Jun. 22, 2010; Stephen C. Jacobsen; office action issued Nov. 30, 2010.
Arnold, Henry, "Cricket the robot documentation." online manual available at http://www.parallaxinc.com, 22 pages.
Iagnemma, Karl et al., "Traction control of wheeled robotic vehicles in rough terrain with application to planetary rovers." International Journal of Robotics Research, Oct.-Nov. 2004, pp. 1029-1040, vol. 23, No. 10-11.
Hirose, et al., "Snakes and strings; new robotic components for rescue operations," International Journal of Robotics Research, Apr.-May 2004, pp. 341-349, vol. 23, No. 4-5.
Paap et al., "A robot snake to inspect broken buildings," IEEE, 2000, pp. 2079-2082, Japan.

Braure, Jerome, "Participation to the construction of a salamander robot: exploration of the morphological configuration and the locomotion controller", Biologically Inspired Robotics Group, master thesis, Feb. 17, 2004, pp. 1-46.
Jacobsen, et al., Advanced intelligent mechanical sensors (AIMS), Proc. IEEE Trandsucers 1991, Jun. 24-27, abstract only, San Fransico, CA.
Jacobsen, et al., "Research robots for applications in artificial intelligence, teleoperation and entertainment", International Journal of Robotics Research, 2004, pp. 319-330, vol. 23, Apr.-May 2004.
Jacobsen, et al., "Multiregime MEMS sensor networks for smart structures," Procs. SPIE 6th Annual Inter. Conf. on Smart Structues and Materials, Mar. 1-5, 1999, pp. 19-32, vol. 3673, Newport Beach CA.
MacLean et al., "A digital MEMS-based strain gage for structural health monitoring," Procs. 1997 MRS Fall Meeting Symposium, Nov. 30-Dec. 4, 1997, pp. 309-320, Boston Massachusetts.
Berlin et al., "MEMS-based control of structural dynamic instability", Journal of Intelligent Material Systems and Structures, Jul. 1998 pp. 574-586, vol. 9.
Goldfarb, "Design and energetic characterization of a liquid-propellant-powered actuator for self-powered robots," IEEE Transactions on Mechatronics, Jun. 2003, vol. 8 No. 2.
Dowling, "Limbless Locomotion: Learning to crawl with a snake robot," The Robotics Institute at Carnegie Mellon University, Dec. 1997, pp. 1-150.
Jacobsen, Stephen, U.S. Appl. No. 11/985,320, filed Nov. 13, 2007.
Jacobsen, Stephen, U.S. Appl. No. 11/985,346, filed Nov. 13, 2007.
Jacobsen, Stephen, U.S. Appl. No. 11/985,324, filed Nov. 13, 2007.
Jacobsen, Stephen, U.S. Appl. No. 11/985,323, filed Nov. 13, 2007.
Jacobsen, Stephen, U.S. Appl. No. 12/171,144, filed Jul. 10, 2008.
Jacobsen, Stephen, U.S. Appl. No. 12/171,146, filed Jul. 10, 2008.
Jacobsen, Stephen, U.S. Appl. No. 12/151,730, filed May 7, 2008.
Jacobsen, Stephen, U.S. Appl. No. 12/117,233, filed May 8, 2008.
Jacobsen, Stephen, U.S. Appl. No. 11/293,701, filed Dec. 1, 2005.
Jacobsen, Stephen, U.S. Appl. No. 11/985,336, filed Nov. 13, 2007.
U.S. Appl. No. 12/171,144, filed Jul. 10, 2008; Stephen C. Jacobsen; office action mailed Jan. 13, 2011.
U.S. Appl. No. 12/694,996, filed Jan. 27, 2010; Stephen C. Jacobsen; office action mailed Jan. 26, 2011.
PCT Application PCT/US2010/038339; filing date Jun. 11, 2010; Stephen C. Jacobsen; ISR mailed Feb. 9, 2011.
U.S. Appl. No. 12/814,302, filed Jun. 11, 2010; Stephen C. Jacobsen.
U.S. Appl. No. 12/814,304, filed Jun. 11, 2010; Stephen C. Jacobsen.
U.S. Appl. No. 12/765,618, filed Apr. 22, 2010; Stephen C. Jacobsen.
Matthew Heverly & Jaret Matthews: "A wheel-on-limb rover for lunar operation" Internet article, Nov. 5, 2008, pp. 1-8, http://robotics.estec.esa.int/i-SAIRAS/isairas2008/Proceedings/Session%2026/m116-Heverly.pdf.
NASA: "Nasa's newest concept vehicles take off-roading out of this world" Internet article, Nov. 5, 2008, http://www.nasa.gov/mission_pages/constellation/main/lunar_truck.html.
Revue Internationale De defense, "3-D vision and urchin" Oct. 1, 1988, p. 1292, vol. 21, No. 10, Geneve CH.
Advertisement, International Defense review, Jane's information group, Nov. 1, 1990, p. 54, vol. 23, No. 11, Great Britain.
Jacobsen, U.S. Appl. No. 12/694,996, filed Jan. 27, 2010.
U.S. Appl. No. 12/765,618, filed Apr. 22, 2010; Stephen C. Jacobsen; office action issued Apr. 6, 2011.
U.S. Appl. No. 11/985,320, filed Nov. 13, 2007; Stephen C. Jacobsen; office action issued Apr. 12, 2011.
U.S. Appl. No. 11/985,324, filed Nov. 13, 2007; Stephen C. Jacobsen; notice of allowance issued Apr. 18, 2011.
U.S. Appl. No. 12/151,730, filed May 7, 2008; Stephen C. Jacobsen; notice of allowance issued Apr. 15, 2011.
U.S. Appl. No. 11/985,336, filed Nov. 13, 2007; Stephen C. Jacobsen; office action issued Jun. 14, 2011.
U.S. Appl. No. 12/820,881, filed Jun. 22, 2010; Stephen C. Jacobsen; notice of allowance issued Jun. 9, 2011.
Ren Luo "Development of a multibehavior-based mobile robot for remote supervisory control through the internet" IEEE/ ASME Transactions on mechatronics, IEEE Service Center, Piscataway, NY, Dec. 1, 2000, vol. 5, No. 4.

Nilas Sueset et al., "A PDA-based high-level human-robot interaction" Robotics, Automation and Mechatronics, IEEE Conference Singapore, Dec. 1-3, 2004, vol. 2, pp. 1158-1163.

U.S. Appl. No. 11/985,320, filed Nov. 13, 2007; Stephen C. Jacobsen; office action mailed Aug. 17, 2011.

U.S. Appl. No. 12/765,618, filed Apr. 22, 2010; Stephen C. Jacobsen; office action issued Sep. 20, 2011.

U.S. Appl. No. 12/11/985,320, filed Nov. 13, 2007; Stephen C. Jacobsen; office action issued Nov. 25, 2011.

U.S. Appl. No. 12/814,302, filed Jun. 11, 2010; Stephen C. Jacobsen; office action issued Jan. 10, 2012.

U.S. Appl. No. 11/985,336, filed Nov. 13, 2007; Stephen C. Jacobsen; notice of allowance issued Jan. 19, 2012.

U.S. Appl. No. 11/985,320, filed Nov. 13, 2007; Stephen C. Jacobsen; Office Action issued Apr. 25, 2012.

U.S. Appl. No. 12/814,302, filed Jun. 11, 2010; Stephen C. Jacobsen; Office Action issued Apr. 18, 2012.

Mehling et al.; A Minimally Invasive Tendril Robot for In-Space Inspection, Feb. 2006; The First IEEE/RAS-EMBS International Conference on Biomedical Robotics and Biomechatronics (BioRob '06) p. 690-695.

U.S. Appl. No. 12/171,146, filed Jul. 10, 2008; Stephen C. Jacobsen; office action dated Aug. 20, 2012.

U.S. Appl. No. 13/181,380, filed Jul. 12, 2011; Stephen C. Jacobsen; office action dated Jul. 17, 2012.

U.S. Appl. No. 12/814,302, filed Jun. 11, 2010; Stephen C. Jacobsen; notice of allowance dated Jul. 25, 2012.

U.S. Appl. No. 12/765,618, filed Apr. 22, 2010; Stephen C. Jacobsen; Notice of Allowance issued Feb. 2, 2012.

U.S. Appl. No. 12/171,146, filed Jul. 10, 2008; Stephen C. Jacobsen; office action issued Feb. 9, 2012.

U.S. Appl. No. 13/481,631; filed May 25, 2012; Ralph W. Pensel; notice of allowance dated Sep. 24, 2012.

U.S. Appl. No. 12/814,304; filed Jun. 11, 2010; Stephen C. Jacobsen; office action dated Nov. 13, 2012.

U.S. Appl. No. 12/117,233; filed May 8, 2008; Stephen C. Jacobsen. office action dated Nov. 23, 2012.

Celaya et al; Control of a Six-Legged Robot Walking on Abrupt Terrain; Proceedings of the 1996 IEE International Conference on Robotics and Automation, Minneapolis, Minnesota; Apr. 1996; 6 pages.

Burg et al; Anti-Lock Braking and Traction Control Concept for All-Terrain Robotic Vehicles; Proceedings of the 1997 IEE International Conference on Robotics and Automation; Albuquerque, New Mexico; Apr. 1997; 6 pages.

\* cited by examiner

POINT AND GO NAVIGATION SYSTEM AND METHOD

FIELD OF THE INVENTION

The present invention relates to navigation control for robotic vehicles.

BACKGROUND OF THE INVENTION AND RELATED ART

Navigating a robotic vehicle remotely through an environment can be quite challenging due to a number of factors. For example, a complex robotic vehicle typically has a large number of operator controls available. One control approach is the so-called replica master mode of operation. The robot is slaved to a replica master, which provides the same joints as the robot. As the operator manipulates the master, the master communicates positions of joints to the robot, which attempts to move to the same position. While replica master mode is handy for some types of robot manipulation (e.g., telemanipulation), this type of control can be a tedious way to remotely navigate a semi-autonomous robot through a varied terrain.

An alternate approach to robotic navigation is to preprogram the robot movements beforehand. While preprogramming is efficient for some types of robot manipulation (e.g., manufacturing), this type of control is not particularly suitable when preplanning is not possible, such as in exploratory operations.

SUMMARY OF THE INVENTION

The present invention includes a method and system for providing point and go navigation for remote control of a robotic vehicle. In one embodiment, a method of providing point and go navigation of a robotic vehicle within an environment is provided. The method can include obtaining sensor information from the robotic vehicle and displaying a visual representation of the environment on an operator console. The method can also include designating a target point within the visual representation of the environment based on operator input, and advancing the robotic vehicle toward a target location in the environment that corresponds to the target point. Movement of the robotic vehicle can be based on an automatic navigation response to the designated target point.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, can be arranged and designed in a wide variety of different configurations. Nonetheless, the invention will be described and explained with additional specificity and detail through the use of the accompanying drawings in which:

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

Figure 1:
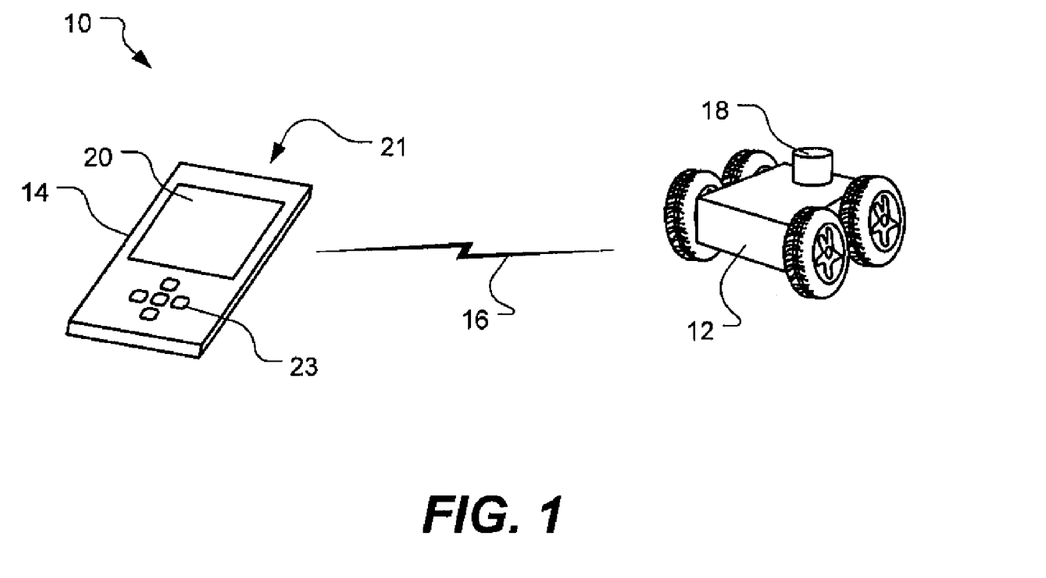
FIG. 1 illustrates a schematic illustration of a system for providing point and go navigation of a robotic vehicle according to an exemplary embodiment of the present invention.

With reference to FIG. 1, shown is an illustration of a system for providing point and go navigation of a robotic vehicle according to a first exemplary embodiment of the present invention. Specifically, FIG. 1 illustrates the system 10 as including a robotic vehicle 12 and a remote operator console 14. The remote operator console is in bi-directional communication with the robotic vehicle via a communications link 16. The communication link can be, for example, a wireless radio frequency link, a free space optical link, a free space ultrasonic link, a wired link, a fiber optic link, or a combination thereof. The communication link may also include one or more relay nodes (not shown), for example, to extend the range for communication between the remote operator console and the robotic vehicle. The relay node may be mounted on a second robotic vehicle.

The robotic vehicle 12 includes at least one environmental sensor 18, such as a camera, a stereo camera, a sound sensor, an electromagnetic sensor, a chemical sensor, a radar, a lidar, a range finder, a scanning range finder, a sonar, a contact sensor, a sniff sensor, a Global Positioning System (GPS) receiver, an inertial measurement unit, an orientation sensor, or a combination thereof The sensor allows the robotic vehicle to obtain information regarding the environment in which it is operating. The robotic vehicle transmits sensor information to the remote operator console 14 via the communication link 16.

The remote operator console 14 includes a display 20 to display a visual representation of the environment based on sensor information received from the robotic vehicle 12. The remote operator console includes an operator input function for defining a target point on the visual representation. The operator input function can be, for example, a touch screen integrated with the display. As another example, the operator input function can be buttons 23 or similar controls on the remote operator console. Navigational commands are transmitted from the remote operator console to the robotic vehicle via the communication link 16 to control movement of the robotic vehicle.

Figure 2:
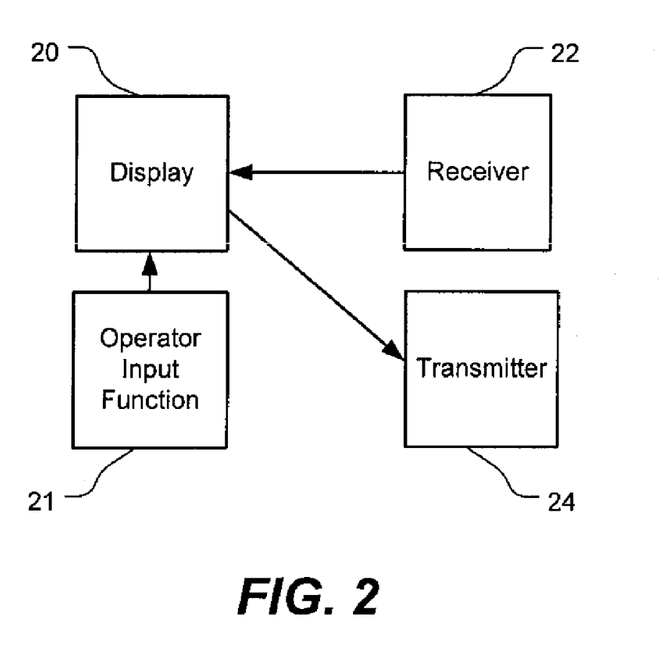
FIG. 2 illustrates a block diagram of a remote operator console for point and go navigation in accordance with an embodiment of the present invention.

An exemplary embodiment of the operator console 14 is shown in further detail in FIG. 2. The operator console includes a receiver 22 for receiving sensor data from the robotic vehicle 12 (FIG. 1). The sensor data is provided to the display 20. The operator console also includes an operator input function 21 to allow designation of a target point. For example, the display can include a touch sensitive screen that allows the operator to designate a target point by touching the display. As another example, the remote operator console can include a keyboard, cursor controls, or other operator input device. For example, an electronic cursor may be moved on the display to designate a target point. As another example, an operator may enter coordinates using a keyboard.

The designated target point on the display 20 corresponds to a target location within the environment in which the robotic vehicle 12 is operating. For example, consider an example where the environment includes a yellow fire hydrant. The yellow fire hydrant may be designated as the target location by touching the portion of the image corresponding to the yellow fire hydrant on the display.

The remote operator console 14 may transmit navigation commands to the robotic vehicle 12 using the transmitter 24 to cause the robotic vehicle to advance toward the designated target location. Navigation of the robotic vehicle 12 toward the designated target location can be performed in various ways. In one example, coordinates corresponding to the designated target location can be transmitted to the robotic vehicle. The coordinates may be defined relative to the position on the display, and translated into an actual location within the environment by the robotic vehicle. Alternately, the coordinates may be defined relative to references points within the environment or other reference datum and coordinate translation provided by the remote operator console. Absolute coordinates may be defined, for example, by combining the displayed sensor data with external information such as maps, GPS position fixes, or the like. The display may also be augmented with additional environmental information obtained independently of the robotic vehicle, such as, for example, an electronic map, environmental sensors, or sensor information from a second robotic vehicle operating within the environment. For example, a second environmental sensor can be mounted on a second robotic vehicle. The second environmental sensor may include, for example, a camera, a stereo camera, a sound sensor, an electromagnetic sensor, a chemical sensor, a radar, a lidar, a range finder, a scanning range finder, a sonar, a contact sensor, a sniff sensor, a Global Positioning System (GPS) receiver, or a combination thereof. The target location may be designated using an operator-defined displacement from the target point. For example, the fire hydrant may be designated using the touch screen and additional operator input provided to specify that the target location is 10 feet to the left of the fire hydrant.

Navigation commands to the robotic vehicle may alternately include a series of movement commands. For example, the remote operator console may include processing to determine a route toward the target point, and then transmit incremental movement commands to the robotic vehicle to navigate toward the target point. Various degrees of sophistication are possible for the automatic navigation. For example, one relatively straightforward automatic navigation approach is to turn the vehicle in a direction corresponding to the designated target and move forward in that direction. As another example, the display may include processing to automatically determine a planned route from a current position of the robotic vehicle toward the target location. Processing may include object identification using image-processing techniques to allow obstacles within the environment to be identified and avoided. The environmental sensor may include range finding, allowing for improved obstacle identification and navigation.

Alternately, operator input can identify a target path, for example, by tracing a curve on the touch sensitive screen to define the target path. The robotic vehicle can then be automatically navigated to follow a travel path in the environment correlated with the target path.

As the robotic vehicle moves through the environment, the display can be updated as new sensor data is received. If desired, the target point may be re-designated by the operator. For example, navigation may be controlled incrementally, designating a target point, navigating the robotic vehicle toward the target point, and re-designating the target point as the robotic vehicle moves.

As mentioned above, some robotic vehicles are capable of multiple movement modes. For example, commonly-owned co-pending U.S. Provisional Patent Application Ser. No. 60/858,917, filed Nov. 13, 2006, and entitled "Serpentine Robotic Crawler," describes one exemplary unmanned ground robotic vehicle having multiple movement modes that may be used in embodiments of the present invention and is incorporated herein by reference. In addition to identifying a target path on the operator console, the operator may also identify transition points on the target path where a movement move or other behavior of the robotic vehicle is to change. When the robotic vehicle reaches the point in the environment corresponding to the transition point, robotic vehicle may change from a first mode of operation to a second mode of operation.

For example, the robotic vehicle describe above includes a stair climbing mode, a tank configuration for movement on a relatively flat surface, and an inside surface climbing mode. A desired path may include movement across a floor area, up a set of stairs, and into a vent duct. Transition points may be designated at the beginning of the stairs, the top of the stairs, and the entry to vent duct. The robotic vehicle may then switch between appropriate movement modes as each different area is entered.

As another example, the robotic vehicle mode of operation may be adjusted automatically based on characteristics of the environment obtained from the sensor information. For example, image recognition software may recognize certain types of obstacles and movement mode changed automatically.

Figure 3:
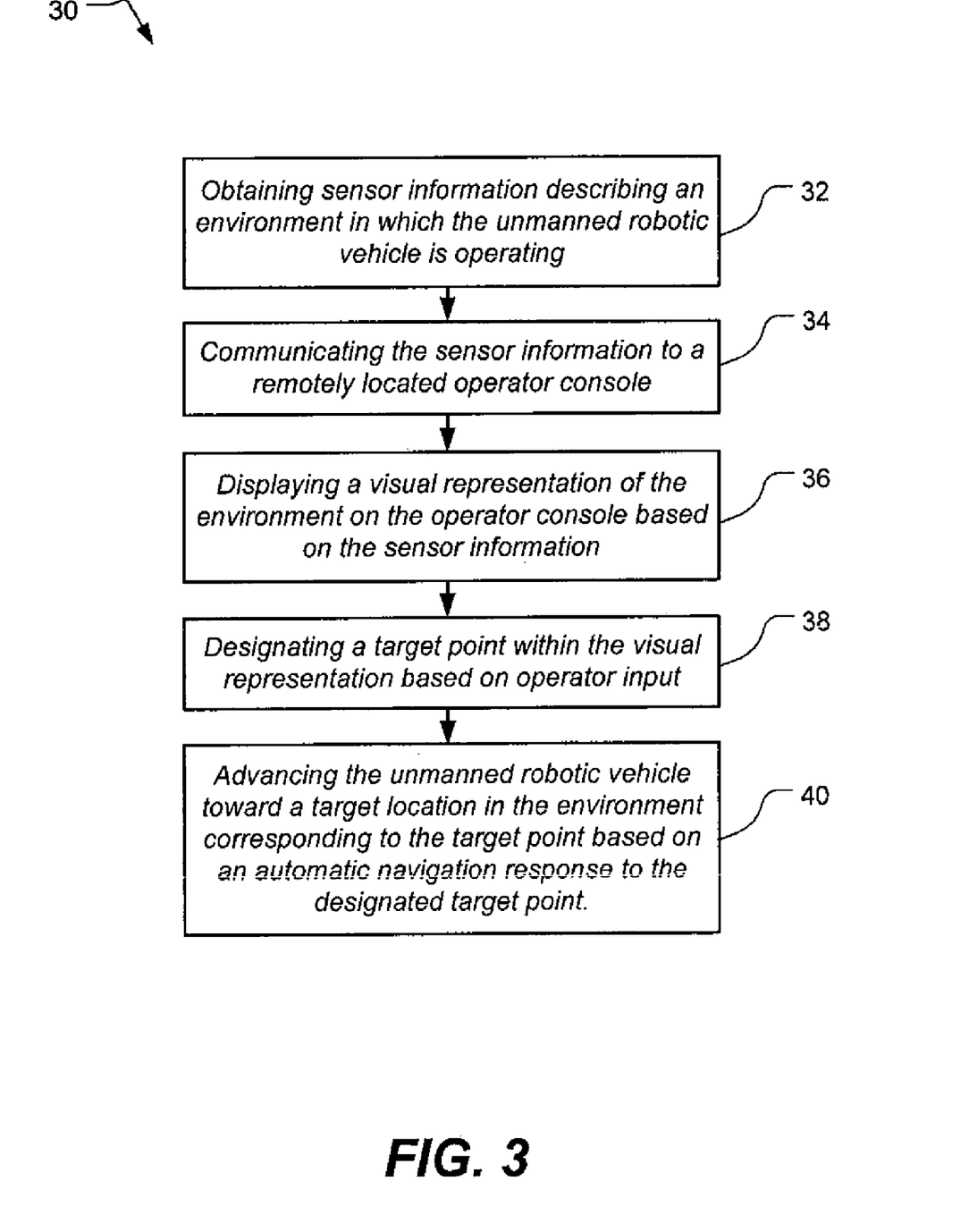
FIG. 3 illustrates a flow chart of a method of providing point and go navigation for remote control of a robotic vehicle in accordance with another embodiment of the present invention.

FIG. 3 illustrates a method of providing point and go navigation. The method 30 includes obtaining 32 sensor information describing an environment in which the robotic vehicle is operating. For example, sensor information may be obtained using sensors mounted on the robotic vehicle as described above. The method also includes communicating 34 the sensor information to a remotely located operator console. For example, a communication link as described above can be used. The method also includes displaying 36 a visual representation of the environment on the operator console, the visual representation being based on the sensor information. The method also includes 38 designating a target point within the visual representation based on operator input. For example, operator input may be via a touch screen or other input device as described above. The method also includes advancing 40 the robotic vehicle toward a target location in the environment corresponding to the target point. Advancing the robotic vehicle can be based on an automatic navigation response to the designated target point, for example as described above.

Summarizing and reiterating to some extent, point and go navigation in accordance with embodiments of the present invention can ease the difficulty of controlling a robotic vehicle. An operator can point to a desired target point on a display screen and the robotic vehicle will automatically go to the designated location. Processing within either the remote operator console or the robotic vehicle can translate a designated target point or path into navigational commands for the robotic vehicle. Thus, the operator is freed from having to specify every detailed movement of the robotic vehicle. If desired, transition points can be designated, and robotic vehicle operation mode changed at the transition points. Applications of such a navigation technique may include search and rescue, military operations, and industrial operations.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present: a) "means for" or "step for" is expressly recited in that limitation; b) a corresponding function is expressly recited in that limitation; and c) structure, material or acts that support that function are described within the specification. Accordingly, the scope of the invention should be determined solely by the appended claims and their legal equivalents, rather than by the descriptions and examples given above.

What is claimed is:

1. A method of providing point and go navigation for remote control of an unmanned robotic vehicle, comprising:
   obtaining sensor information describing an environment in which the unmanned robotic vehicle is operating;
   communicating the sensor information to a remotely located operator console;
   displaying a visual representation of the environment on the operator console based on the sensor information;
   designating a target point within the visual representation based on operator input;
   designating a transition point within the visual representation based on operator input;
   advancing the unmanned robotic vehicle toward a target location in the environment based on an automatic navigation response to the designated target point, which includes automatically determining a planned route from a current unmanned robotic vehicle position to the target location; and
   advancing the unmanned robotic vehicle to the transition point, wherein the robotic vehicle is caused to reconfigure from a first pose corresponding to a first mode of operation to a second pose corresponding to a second mode of operation.

2. The method of claim 1, wherein the target location is defined as an operator-defined displacement from a point in the environment corresponding to the target point.

3. The method of claim 1, further comprising:
   updating the visual representation of the environment on the operator console as the unmanned robotic vehicle moves through the environment; and
   re-designating the target point within the updated visual representation based on additional operator input.

4. The method of claim 1, further comprising displaying a visual representation of the planned route on the operator console.

5. The method of claim 1, further comprising modifying the planned route based on operator input.

6. The method of claim 1, further comprising:
   identifying a target path within the visual representation based on the operator input; and
   automatically navigating the unmanned robotic vehicle to follow a travel path in the environment correlated with the target path.

7. The method of claim 1, wherein designating the target point comprises touching the operator console at the target point on the visual representation of the environment.

8. The method of claim 1, wherein designating the target point comprises placing an electronic cursor at the target point on the visual representation of the environment.

9. The method of claim 1, wherein the target point is defined by entering coordinates into the operator console.

10. The method of claim 1, further comprising augmenting the visual representation of the environment using additional environmental information obtained independently of the unmanned robotic vehicle.

11. The method claim 10, wherein the additional environmental information is obtained from an electronic map.

12. The method claim 10, wherein the additional environmental information is obtained from a second environmental sensor.

13. The method of claim 12, wherein the second environmental sensor is mounted on a second unmanned robotic vehicle.

14. The method claim 10, wherein the additional environmental information is obtained from a GPS receiver.

15. The method of claim 1, further comprising:
   identifying a characteristic of the environment from the sensor information; and
   modifying unmanned robotic vehicle behavior based on the characteristic.

16. A system for providing point and go navigation of an unmanned robotic vehicle, the system comprising:
   a) an unmanned robotic vehicle having an environmental sensor and a transmitter and receiver unit, and being capable of controlled movement within an environment; and
   b) a remote operator console in bi-directional communication with the unmanned robotic vehicle, the remote operator console comprising:

i) a receiver for receiving sensor information from the unmanned robotic vehicle;
ii) a display for displaying a visual representation of the environment based on the sensor information received from the environmental sensor;
iii) an operator input function for defining at least one of a target point and a transition point on the visual representation, and
iv) a transmitter for transmitting navigational commands to the unmanned robotic vehicle based on the target point,
wherein the vehicle automatically determines a planned route from a current unmanned robotic vehicle position to a target location in the environment based at least in part on the target point, and
wherein the vehicle, upon reaching the transition point, reconfigures from a first pose corresponding to a first mode of operation to a second pose corresponding to a second mode of operation.

17. The system of claim 16, wherein the navigational commands comprise target point coordinates.

18. The system of claim 17, wherein the target point coordinates are defined relative to the visual representation.

19. The system of claim 16, wherein the navigational commands comprise a series of movement commands.

20. The system of claim 16, wherein the environmental sensor is chosen from the group consisting of a camera, a stereo camera, a sound sensor, an electromagnetic sensor, a chemical sensor, a radar, a lidar, a range finder, a scanning range finder, a sonar, a contact sensor, a sniff sensor, a GPS receiver, an inertial measurement unit, an orientation sensor, and combinations thereof.

21. The system of claim 16, wherein the display and operator input are provided by a touch screen.

22. The system of claim 16, further comprising a communication link between the unmanned robotic vehicle and the remote operator console.

23. The system of claim 22, wherein the communication link is selected from the group consisting of a wireless radio frequency link, a free space optical link, a free space ultrasonic link, a wired link, a fiber optic link, and combinations thereof.

24. The system of claim 23, wherein the communication link further comprises at least one relay node.

* * * * *